United States Patent
Konishi et al.

(10) Patent No.: US 12,435,212 B2
(45) Date of Patent: Oct. 7, 2025

(54) RESIN COMPOSITION AND MOLDED BODY

(71) Applicant: KURARAY CO., LTD., Okayama (JP)

(72) Inventors: Daisuke Konishi, Ibaraki (JP);
Hiromitsu Sasaki, Ibaraki (JP);
Takumi Hasegawa, Ibaraki (JP);
Kazumasa Kusudo, Okayama (JP)

(73) Assignee: KURARAY CO., LTD., Okayama (JP)

( * ) Notice: Subject to any disclaimer, the term of this patent is extended or adjusted under 35 U.S.C. 154(b) by 568 days.

(21) Appl. No.: 17/802,646

(22) PCT Filed: Feb. 25, 2021

(86) PCT No.: PCT/JP2021/007152
§ 371 (c)(1),
(2) Date: Aug. 26, 2022

(87) PCT Pub. No.: WO2021/172448
PCT Pub. Date: Sep. 2, 2021

(65) Prior Publication Data
US 2023/0025461 A1    Jan. 26, 2023

(30) Foreign Application Priority Data
Feb. 27, 2020  (JP) .................. 2020-032152

(51) Int. Cl.
C08L 23/08      (2025.01)
C08F 236/04     (2006.01)
C08L 23/0853    (2025.01)
C08L 25/00      (2006.01)
C08L 53/00      (2006.01)
C08L 53/02      (2006.01)

(52) U.S. Cl.
CPC .......... *C08L 25/00* (2013.01); *C08F 236/045* (2013.01); *C08L 23/0853* (2013.01); *C08L 53/00* (2013.01); *C08L 53/02* (2013.01)

(58) Field of Classification Search
None
See application file for complete search history.

(56) References Cited

U.S. PATENT DOCUMENTS

| 7,655,739 | B1 * | 2/2010 | McPhee | C09J 147/00 525/333.1 |
| 2007/0275197 | A1 | 11/2007 | Chow et al. | |
| 2010/0317802 | A1 * | 12/2010 | Aoyama | C09J 7/38 525/190 |
| 2013/0086822 | A1 | 4/2013 | Choi et al. | |
| 2014/0076473 | A1 | 3/2014 | Abad et al. | |
| 2016/0312023 | A1 | 10/2016 | Tanaka et al. | |
| 2017/0029668 | A1 | 2/2017 | Nelson et al. | |
| 2018/0030194 | A1 | 2/2018 | Uehara et al. | |

FOREIGN PATENT DOCUMENTS

| CN | 107207685 A | 9/2017 |
| EP | 3 841 909 A1 | 6/2021 |
| JP | 2003-292672 A | 10/2003 |
| JP | 2004-75882 A | 3/2004 |
| JP | 2007-314788 A | 12/2007 |
| JP | 2014-520017 A | 8/2014 |
| JP | 2014-189697 A | 10/2014 |
| JP | 2016-113614 A | 6/2016 |
| JP | 2016-210937 A | 12/2016 |
| JP | 2017-39819 A | 2/2017 |
| JP | 2018-24776 A | 2/2018 |
| JP | 2018-528297 A | 9/2018 |
| JP | 2019-011471 A | 1/2019 |
| JP | 2019-26826 A | 2/2019 |
| JP | 2019-052225 A | 4/2019 |
| WO | WO 2006/121069 A1 | 11/2006 |
| WO | WO 2015/087955 A1 | 6/2015 |

OTHER PUBLICATIONS

Official communication issued in EP Patent Application No. 21761786.9, 26 Feb. 26, 2024.
ISR for PCT/JP2021/007152, dated May 11, 2021.

* cited by examiner

*Primary Examiner* — Richard A. Huhn
(74) *Attorney, Agent, or Firm* — GREENBLUM & BERNSTEIN, P.L.C.

(57) ABSTRACT

A resin composition containing an ethylene-vinyl acetate copolymer (I) and a hydrogenated block copolymer (II), wherein the hydrogenated block copolymer (II) is a hydrogenated product of a block copolymer (P) containing a polymer block (A) containing a structural unit derived from an aromatic vinyl compound and a polymer block (B) containing 1 to 100% by mass of a structural unit (b1) derived from farnesene and 99 to 0% by mass of a structural unit (b2) derived from a conjugated diene other than farnesene, wherein the hydrogenation rate of carbon-carbon double bonds in the structural unit derived from a conjugated diene in the block copolymer (P) is 70 mol % or more, and in the resin composition, the content of the ethylene-vinyl acetate copolymer (I) is 40 to 95% by mass and the content of the hydrogenated block copolymer (II) is 5 to 60% by mass.

10 Claims, No Drawings

RESIN COMPOSITION AND MOLDED BODY

TECHNICAL FIELD

The present invention relates to a resin composition containing at least an ethylene-vinyl acetate copolymer and a hydrogenated block copolymer having a structural unit derived from farnesene, and a molded body using the resin composition.

BACKGROUND ART

Rubber compositions obtained by mixing a thermoplastic elastomer such as a styrene-based elastomer or an olefin-based elastomer with various rubbers are used in a wide range of fields such as shoe soles for footwear, various tires, building materials such as packings, and mechanical parts due to excellent mechanical properties and flexibility. However, a rubber composition containing a thermoplastic elastomer becomes slippery due to adhesion of moisture, and this is particularly problematic in applications such as shoe soles for footwear and various tires due to high risk.

Therefore, studies have been made to improve wet grip performance of a rubber composition containing a thermoplastic elastomer and a rubber component.

For example, a resin composition in which the number average molecular weight of the thermoplastic elastomer or the glass transition temperature of the rubber component is specified or a resin composition containing a tackifier resin and a hydrogenated block copolymer has been proposed (for example, PTLs 1 to 8). In addition, a resin composition containing a hydrogenated block copolymer including a polymer block containing a structural unit derived from farnesene has been proposed (for example, PTL 9).

CITATION LIST

Patent Literature

PTL 1: US 2013/0086822 A1
PTL 2: WO 2006/121069 A1
PTL 3: JP 2017-39819 A
PTL 4: JP 2016-210937 A
PTL 5: JP 2014-189697 A
PTL 6: JP 2014-520017 A
PTL 7: JP 2004-75882 A
PTL 8: JP 2003-292672 A
PTL 9: JP 2019-26826 A

SUMMARY OF INVENTION

Technical Problem

However, in the techniques disclosed in PTLs 1 to 8, a resin composition having an excellent balance between dry grip performance and wet grip performance cannot be obtained, and further improvement is required. In this regard, PTLs 1 to 8 do not describe a block copolymer including a polymer block containing a structural unit derived from an aromatic vinyl compound and a polymer block containing a structural unit derived from farnesene, and a hydrogenated product thereof.

Further, although the resin composition disclosed in PTL 9 is excellent in balance between dry grip performance and wet grip performance, further improvement is required.

Therefore, an object of the present invention is to provide a resin composition capable of providing a molded body excellent in dry grip performance and wet grip performance, and a molded body using the resin composition.

Solution to Problem

As a result of intensive studies in view of the above problems, the present inventors have found that the above problems can be solved by using an ethylene-vinyl acetate copolymer and a specific hydrogenated block copolymer in specific blending amounts.

That is, the present invention relates to the following [1] to [11].

[1] A resin composition containing an ethylene-vinyl acetate copolymer (I) and a hydrogenated block copolymer (II), wherein the hydrogenated block copolymer (II) is a hydrogenated product of a block copolymer (P) containing a polymer block (A) containing a structural unit derived from an aromatic vinyl compound and a polymer block (B) containing 1 to 100% by mass of a structural unit (b1) derived from farnesene and 99 to 0% by mass of a structural unit (b2) derived from a conjugated diene other than farnesene, wherein the hydrogenation rate of carbon-carbon double bonds in the structural unit derived from a conjugated diene in the block copolymer (P) is 70 mol % or more, and in the resin composition, the content of the ethylene-vinyl acetate copolymer (I) is 40 to 95% by mass and the content of the hydrogenated block copolymer (II) is 5 to 60% by mass.

[2] The resin composition as set forth in [1], having a biomass degree of 4 to 70% by mass.

[3] The resin composition as set forth in [1] or [2], wherein a content ratio of a structural unit derived from vinyl acetate in the ethylene-vinyl acetate copolymer (I) is 5 to 60% by mass.

[4] The resin composition as set forth in any one of [1] to [3], wherein the aromatic vinyl compound is styrene.

[5] The resin composition as set forth in any one of [1] to [4], wherein the conjugated diene other than farnesene is at least one selected from butadiene, isoprene, and myrcene.

[6] The resin composition as set forth in any one of [1] to [5], wherein a mass ratio [(A)/(B)] of the polymer block (A) to the polymer block (B) is 10/90 to 40/60.

[7] The resin composition as set forth in any one of [1] to [6], wherein the hydrogenated block copolymer (II) further has a polymer block (C) composed only of a structural unit derived from a conjugated diene other than farnesene.

[8] The resin composition as set forth in any one of [1] to [7], wherein an SP value of the ethylene-vinyl acetate copolymer (I) is 4.0 to 10.0 $(cal/cm^3)^{1/2}$, and an SP value of the hydrogenated block copolymer (II) is 6.0 to 10.0 $(cal/cm^3)^{1/2}$.

[9] The resin composition as set forth in any one of [1] to [8], wherein the hydrogenated block copolymer (II) has a peak top molecular weight of 50,000 to 500,000.

[10] The resin composition as set forth in any one of [1] to [9], wherein the polymer block (A) has a peak top molecular weight of 5,000 to 100,000.

[11] A molded body at least partially using the resin composition as set forth in any one of [1] to [10].

Advantageous Effects of Invention

According to the present invention, it is possible to provide a resin composition capable of providing a molded body excellent in dry grip performance and wet grip performance, and a molded body using the resin composition.

DESCRIPTION OF EMBODIMENTS

[Resin Composition]

The present invention is concerned with a resin composition containing an ethylene-vinyl acetate copolymer (I) and a hydrogenated block copolymer (II), wherein the hydrogenated block copolymer (II) is a hydrogenated product of a block copolymer (P) containing a polymer block (A) containing a structural unit derived from an aromatic vinyl compound and a polymer block (B) containing 1 to 100% by mass of a structural unit (b1) derived from farnesene and 99 to 0% by mass of a structural unit (b2) derived from a conjugated diene other than farnesene, wherein the hydrogenation rate of carbon-carbon double bonds in the structural unit derived from a conjugated diene in the block copolymer (P) is 70 mol % or more, and in the resin composition, the content of the ethylene-vinyl acetate copolymer (I) is 40 to 95% by mass and the content of the hydrogenated block copolymer (II) is 5 to 60% by mass.

According to the resin composition of the present invention, since the ethylene-vinyl acetate copolymer (I) and the hydrogenated block copolymer (II) are used in specific blending amounts, a molded body excellent in dry grip performance and wet grip performance can be obtained when the resin composition is made into a molded body.

<Ethylene-Vinyl Acetate Copolymer (I)>

In the ethylene-vinyl acetate copolymer (I) used in the present invention, the content ratio (VA ratio) of the structural unit derived from vinyl acetate in the copolymer is preferably 5 to 60% by mass, more preferably 5 to 55% by mass, and still more preferably 10 to 50% by mass. When the content ratio of the structural unit derived from vinyl acetate in the ethylene-vinyl acetate copolymer is within the above range, a molded body excellent in dry grip performance and wet grip performance is easily obtained.

The SP value of the ethylene-vinyl acetate copolymer (I) is preferably 4.0 to 10.0 $(cal/cm^3)^{1/2}$, more preferably 5.0 to 9.5 $(cal/cm^3)^{1/2}$, still more preferably 6.0 to 9.0 $(cal/cm^3)^{1/2}$, and even more preferably 7.0 to 9.0 $(cal/cm^3)^{1/2}$. When the SP value of the ethylene-vinyl acetate copolymer (I) is within the above range, the compatibility with the hydrogenated block copolymer (II) is easily improved, and the dry grip performance and wet grip performance of a molded body can be improved.

In the present invention, the SP value (solubility parameter) is calculated based on D. W. Van Krevelen's estimation method, and the estimation method is calculated based on the cohesive energy density and the molar molecular volume (D. W. Van Krevelen, Klaaste Nijenhuis, "Properties of Polymers, Fourth Edition" Elsevier Science, 2009).

The MFR (melt flow rate) of the ethylene-vinyl acetate copolymer (I) at a temperature of 190° C. and a load of 2.16 kg is preferably 0.5 to 20.0 g/10 minutes, more preferably 1.0 to 15.0 g/10 minutes, and still more preferably 1.2 to 10.0 g/10 minutes. When the MFR is within the above range, the foamability becomes good.

In the ethylene-vinyl acetate copolymer (I) used in the present invention, a copolymer using vinyl alcohol produced by hydrolyzing a part of vinyl acetate along with ethylene and vinyl acetate are also included.

The vinyl acetate content in this case is defined as the total amount of vinyl acetate and vinyl alcohol in the copolymer.

Examples of commercially available products of the ethylene-vinyl acetate copolymer (I) which can be used in the present invention include "EVAFLEX" (trade name, registered trademark) manufactured by Dow-Mitsui Polychemicals Co., Ltd., "Ultrathene" (trade name, registered trademark) manufactured by Tosoh Corporation, "UBE Polyethylene" (trade name, registered trademark) manufactured by Ube Industries, Ltd., "Suntec" (trade name, registered trademark) manufactured by Asahi Kasei Corporation, and "ethylene-vinyl acetate copolymer NUC" (brand name) manufactured by ENEOS NUC Corporation.

<Hydrogenated Block Copolymer (II)>

The hydrogenated block copolymer (II) used in the present invention is a hydrogenated product of a block copolymer (P) containing a polymer block (A) containing a structural unit derived from an aromatic vinyl compound and a polymer block (B) containing 1 to 100% by mass of a structural unit (b1) derived from farnesene and 99 to 0% by mass of a structural unit (b2) derived from a conjugated diene other than farnesene, wherein the hydrogenation rate of carbon-carbon double bonds in the structural unit derived from a conjugated diene in the block copolymer (P) is 70 mol % or more.

In the present invention, by using the hydrogenated block copolymer, it is possible to obtain a resin composition capable of providing a molded body excellent in dry grip performance and wet grip performance.

[Polymer Block (A)]

Examples of the aromatic vinyl compound constituting the polymer block (A) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N, N-diethyl-4-aminoethylstyrene, vinylpyridine, 4-methoxystyrene, monochlorostyrene, dichlorostyrene, and divinylbenzene. These aromatic vinyl compounds may be used alone or in combination of two or more thereof.

Among these, styrene, α-methylstyrene, and 4-methylstyrene are more preferable, and styrene is still more preferable.

The peak top molecular weight (Mp) of the polymer block (A) is preferably 5,000 to 100,000, more preferably 6,000 to 75,000, and still more preferably 7,000 to 50,000. When the peak top molecular weight (Mp) of the polymer block (A) composed of a structural unit derived from styrene is within the above range, it is possible to obtain a resin composition which provides a molded body having excellent dry grip performance and wet grip performance while improving the handleability at the time of production.

The peak top molecular weight (Mp) in the description herein means a value measured by a method described in Examples described later.

The "peak top molecular weight" described in the description herein and the claims is all a peak top molecular weight in terms of standard polystyrene obtained by gel permeation chromatography (GPC) measurement, and more specifically, a value measured according to the method described in Examples.

The peak top molecular weight of each polymer block of the block copolymer (P) can be determined by measuring the sampled liquid each time the polymerization of each polymer block is completed in the production process. For example, when a triblock copolymer having an a1-b-a2 structure is synthesized by sequential polymerization in the order of a1, b, and a2, the peak top molecular weight of the first polymer block a1 can be determined by measuring the liquid sampled at the completion of polymerization of a1 by GPC. The peak top molecular weight of the polymer block b can be determined by measuring the liquid sampled at the completion of polymerization of the polymer block b by GPC to obtain the peak top molecular weight of the diblock copolymer having the structure of a1-b, and subtracting the peak top molecular weight of the polymer block a1 from the obtained value. Further, the peak top molecular weight of the polymer block a2 can be determined by measuring the liquid sampled at the completion of polymerization of a2 by GPC to obtain the peak top molecular weight of the triblock copolymer having the structure of a1-b-a2, and subtracting the peak top molecular weight of the diblock copolymer having the structure of a1-b from the obtained value.

[Polymer Block (B)]

The polymer block (B) contains 1 to 100% by mass of a structural unit (b1) derived from farnesene and 99 to 0% by mass of a structural unit (b2) derived from a conjugated diene other than farnesene.

The farnesene constituting the structural unit (b1) derived from farnesene may be either α-farnesene or β-farnesene represented by the following formula (I), but from the viewpoint of ease of production of the hydrogenated block copolymer, β-farnesene is preferably used. Note that α-farnesene and β-farnesene may be used in combination.

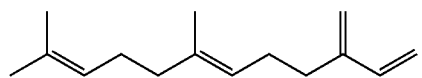

(I)

Examples of the conjugated diene constituting the structural unit (b2) derived from a conjugated diene other than farnesene include butadiene, isoprene, 2,3-dimethylbutadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, farnesene, and chloroprene. These may be used alone or in combination of two or more thereof. Among these, at least one selected from butadiene, isoprene, and myrcene is preferable.

The polymer block (B) in the present invention contains 1 to 100% by mass of a structural unit (b1) derived from farnesene and 99 to 0% by mass of a structural unit (b2) derived from a conjugated diene other than farnesene. When the content of each structural unit is within the above range, the dry grip performance and wet grip performance of the obtained molded body are improved.

From this viewpoint, the content of the structural unit (b1) derived from farnesene is more preferably 30 to 100% by mass, still more preferably 50 to 100% by mass, and even more preferably 70 to 100% by mass.

On the other hand, the content of the structural unit (b2) derived from a conjugated diene other than farnesene is more preferably 0 to 70% by mass, still more preferably 0 to 50% by mass, and even more preferably 0 to 30% by mass.

The mass ratio [(A)/(B)] of the polymer block (A) to the polymer block (B) is preferably 10/90 to 40/60. When the content of the polymer block (A) is at least the above lower limit value, a hydrogenated block copolymer excellent in flexibility and molding processability can be obtained. On the other hand, when the mass ratio is equal to or less than the upper limit value, compatibility with the ethylene-vinyl acetate copolymer (I) and molding processability are improved. From this viewpoint, the mass ratio [(A)/(B)] of the polymer block (A) to the polymer block (B) is more preferably 15/85 to 35/65, and still more preferably 15/85 to 30/70.

[Polymer Block (C)]

The hydrogenated block copolymer (II) obtained by hydrogenating the block copolymer (P) preferably further contains a polymer block (C) containing a structural unit derived from a conjugated diene other than farnesene, in addition to the polymer block (A) and the polymer block (B).

In the polymer block (C) in the present invention, the content of a structural unit derived from farnesene is preferably less than 1% by mass, and the content of a structural unit derived from a conjugated diene other than farnesene is preferably 1 to 100% by mass.

Examples of the conjugated diene other than farnesene, constituting the polymer block (C) include the same conjugated dienes as those described above for the conjugated diene other than farnesene constituting the polymer block (B).

Among them, isoprene, butadiene, and myrcene are preferable as the conjugated diene constituting the polymer block (C), and isoprene and butadiene are more preferable.

The content of the structural unit derived from a conjugated diene other than farnesene in the polymer block (C) is preferably 60 to 100% by mass, more preferably 80 to 100% by mass, still more preferably 90 to 100% by mass, and even more preferably substantially 100% by mass, that is, the polymer block (C) consists only of the structural unit derived from a conjugated diene other than farnesene. The content of the structural unit derived from farnesene in the polymer block (C) is preferably 0% by mass.

Further, the polymer block (C) may contain a structural unit other than the structural unit derived from farnesene and the structural unit derived from a conjugated diene other than farnesene.

Examples of the monomer constituting the other structural unit include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene; and functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamido-2-methylpropanesulfonic acid, 2-methacrylamido-2-methylpropanesulfonic acid, vinylsulfonic acid, vinyl acetate, and methyl vinyl ether.

In the polymer block (C), the total content of the structural unit derived from farnesene and the structural unit derived from a conjugated diene other than farnesene is preferably 60% by mass or more, more preferably 80% by mass or more, and still more preferably 100% by mass.

[Bonding Form]

The hydrogenated block copolymer (II) is a hydrogenated product of the block copolymer (P) containing at least one polymer block (A) and at least one polymer block (B), and may contain a polymer block (C) as necessary.

The bonding form of the polymer block (A), the polymer block (B), and the polymer block (C) is not particularly limited, and may be linear, branched, radial or a combination of two or more thereof. Among them, a form in which each block is linearly bonded is preferable, and when the polymer block (A) is represented by a, the polymer block (B) is represented by b, and the polymer block (C) is represented by c, bonding forms represented by $(a-b)_l$, $a-(b-a)_m$, $b-(a-b)_n$, b-a-c-a-b, and a-b-a are preferable. Each of l, m, and n independently represents an integer of 1 or more.

When the block copolymer (P) has two or more polymer blocks (A) or two or more polymer blocks (B), the respective polymer blocks may be polymer blocks composed of the same structural unit or may be polymer blocks composed of different structural units. For example, in the two polymer blocks (A) in the triblock copolymer represented by [a-b-a], the kinds of the respective aromatic vinyl compounds may be the same or different.

The hydrogenated block copolymer (II) may be one in which block polymers of the same kind are linearly bonded via a bifunctional coupling agent or the like. For example, the copolymer represented by b-a-c-a-b may be a copolymer represented by b-a-c-x-c-a-b (x represents a coupling residue) in which the copolymers represented by b-a-c are coupled to each other. In this case, the portion represented by c-x-c is regarded as one block c.

Examples of the coupling agent include alkoxysilane compounds such as diethoxydimethylsilane, trimethoxymethylsilane, triethoxymethylsilane, tetramethoxysilane, tetraethoxysilane, tetrabutoxysilane, tetrakis(2-ethylhexyloxy) silane, bis(triethoxysilyl)ethane, and 3-aminopropyltriethoxysilane; divinylbenzene; polyvalent epoxy compounds such as epoxidized 1,2-polybutadiene, epoxidized soybean oil, and tetraglycidyl-1,3-bisaminomethylcyclohexane; and halides such as tin tetrachloride, tetrachlorosilane, trichlorosilane, trichloromethylsilane, dichlorodimethylsilane, and dibromodimethylsilane.

The peak top molecular weight (Mp) of the hydrogenated block copolymer (II) is preferably 50,000 to 500,000, more preferably 70,000 to 400,000, still more preferably 90,000 to 300,000, and even more preferably 100,000 to 250,000, from the viewpoint of improving molding processability. The peak top molecular weight (Mp) in the description herein means a value measured by a method described in Examples described later.

The molecular weight distribution (Mw/Mn) of the hydrogenated block copolymer (II) is preferably 1.00 to 4.00, more preferably 1.00 to 3.00, and still more preferably 1.00 to 2.00. When the molecular weight distribution is within the above range, the hydrogenated block copolymer (II) has a small variation in viscosity and thus is easy to handle.

<Method for Producing Hydrogenated Block Copolymer (II)>

The hydrogenated block copolymer (II) can be suitably produced by, for example, a polymerization step of obtaining the block copolymer (P) by anionic polymerization, and a step of hydrogenating the carbon-carbon double bonds in the polymer block (B) and the polymer block (C) in the block copolymer (P).

[Polymerization Step]

The block copolymer (P) can be produced by a solution polymerization method, a method described in JP 2012-502135 T and JP 2012-502136 T, or the like. Among them, a solution polymerization method is preferable, and for example, a known method such as an ionic polymerization method such as anionic polymerization or cationic polymerization, or a radical polymerization method can be applied. Among them, an anionic polymerization method is preferable. In the anionic polymerization method, an aromatic vinyl compound, farnesene and/or a conjugated diene other than farnesene are sequentially added in the presence of a solvent, an anionic polymerization initiator, and optionally a Lewis base to obtain a block copolymer (P).

Examples of the anionic polymerization initiator include alkali metals such as lithium, sodium, and potassium; alkaline earth metals such as beryllium, magnesium, calcium, strontium, and barium; lanthanoid-based rare earth metals such as lanthanum and neodymium; and compounds containing the alkali metals, the alkaline earth metals, and the lanthanoid-based rare earth metals. Among them, alkali metals and compounds containing alkali metals are preferable, and organic alkali metal compounds are more preferable.

Examples of the organic alkali metal compound include organic lithium compounds such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, and 1,3,5-trilithiobenzene; and sodium naphthalene and potassium naphthalene. Among them, organic lithium compounds are preferable, n-butyllithium and sec-butyllithium are more preferable, and sec-butyllithium is particularly preferable. The organic alkali metal compound may be reacted with a secondary amine such as diisopropylamine, dibutylamine, dihexylamine or dibenzylamine to be used as an organic alkali metal amide.

The amount of the organic alkali metal compound used for polymerization varies depending on the molecular weight of the block copolymer (P), but is usually in the range of 0.01 to 3% by mass with respect to the total amount of the aromatic vinyl compound, farnesene, and conjugated diene other than farnesene.

The solvent is not particularly limited as long as it does not adversely affect the anionic polymerization reaction, and examples thereof include saturated aliphatic hydrocarbons such as n-pentane, isopentane, n-hexane, n-heptane, and isooctane; saturated alicyclic hydrocarbons such as cyclopentane, cyclohexane, and methylcyclopentane; and aromatic hydrocarbons such as benzene, toluene, and xylene. These may be used alone or in combination of two or more thereof. The amount of the solvent used is not particularly limited.

The Lewis base has a role of controlling the microstructure in the structural unit derived from farnesene and the structural unit derived from a conjugated diene other than farnesene. Examples of the Lewis base include ether compounds such as dibutyl ether, diethyl ether, tetrahydrofuran, dioxane, ethylene glycol diethyl ether, and ditetrahydrofurylpropane; pyridine; tertiary amines such as N,N,N',N'-tetramethylethylenediamine, and trimethylamine; alkali metal alkoxides such as potassium t-butoxide; and phosphine compounds. When a Lewis base is used, the amount thereof is usually preferably in the range of 0.01 to 1000 molar equivalents with respect to 1 mol of the anionic polymerization initiator.

The temperature of the polymerization reaction is usually in the range of −80 to 150° C., preferably 0 to 100° C., and more preferably 10 to 90° C. The polymerization reaction may be carried out batchwise or continuously. The block copolymer (P) can be produced by continuously or intermittently supplying each monomer to the polymerization reaction solution so that the amounts of the aromatic vinyl compound, farnesene and/or conjugated diene other than farnesene present in the polymerization reaction system fall within specific ranges, or by sequentially polymerizing each monomer in the polymerization reaction solution so that each monomer has a specific ratio.

The polymerization reaction can be terminated by adding an alcohol such as methanol or isopropanol as a polymerization terminator. The block copolymer (P) can be isolated by pouring the obtained polymerization reaction solution into a poor solvent such as methanol to precipitate the block copolymer (P), or by washing the polymerization reaction solution with water, followed by separation and drying.

In the present polymerization step, an unmodified block copolymer (P) may be obtained as described above, but a modified block copolymer (P) may be obtained by introducing a functional group into the block copolymer (P) before the hydrogenation step described later. Examples of the functional group that can be introduced include an amino group, an alkoxysilyl group, a hydroxy group, an epoxy group, a carboxy group, a carbonyl group, a mercapto group, an isocyanate group, a chloro group, and an acid anhydride.

Examples of the modifying method of the block copolymer (P) include a method of adding a modifying agent such as tin tetrachloride, tetrachlorosilane, dichlorodimethylsilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, 4,4'-bis(diethylamino)benzophenone, and N-vinylpyrrolidone, or other modifying agents described in JP 2011-132298 A, which can react with a polymerization active terminal, before adding a polymerization terminator. Further, the isolated copolymer may be grafted with maleic anhydride or the like before use.

The position at which the functional group is introduced may be a polymerization terminal or a side chain of the block copolymer (P). These functional groups may be used alone or in combination of two or more thereof. The amount of the modifying agent is usually in the range of 0.01 to 10 molar equivalents with respect to the anionic polymerization initiator.

[Hydrogenation Step]

The hydrogenated block copolymer (II) can be obtained by subjecting the block copolymer (P) or the modified block copolymer (P) obtained by the above method to a step of hydrogenation. As the hydrogenation method, a known method can be used. For example, the hydrogenation reaction is carried out in the presence of a Ziegler catalyst; a nickel, platinum, palladium, ruthenium or rhodium metal catalyst supported on carbon, silica, diatomaceous earth or the like; an organometallic complex having a cobalt, nickel, palladium, rhodium or ruthenium metal, or the like as a hydrogenation catalyst in a solution prepared by dissolving the block copolymer (P) in a solvent which does not affect the hydrogenation reaction. In the hydrogenation step, the hydrogenation reaction may be carried out by adding a hydrogenation catalyst to the polymerization reaction solution containing the block copolymer (P) obtained by the above-described method for producing the block copolymer (P). In the present invention, palladium-carbon in which palladium is supported on carbon is preferable.

In the hydrogenation reaction, the hydrogen pressure is preferably 0.1 to 20 MPa, the reaction temperature is preferably 100 to 200° C., and the reaction time is preferably 1 to 20 hours.

The hydrogenation rate of the carbon-carbon double bond in the hydrogenated block copolymer (II) is preferably 70 to 100 mol %, more preferably 80 to 100 mol %, still more preferably 85 to 100 mol %, and even more preferably 90 to 100 mol %, from the viewpoint of obtaining a thermoplastic elastomer composition excellent in flexibility and molding processability. The hydrogenation rate can be calculated by measuring the $^1$H-NMR of the block copolymer (P) and the hydrogenated block copolymer (II) after hydrogenation.

The SP value of the hydrogenated block copolymer (II) is preferably 6.0 to 10.0 $(cal/cm^3)^{1/2}$, more preferably 7.0 to 9.5 $(cal/cm^3)^{1/2}$, and still more preferably 8.0 to 9.0 $(cal/cm^3)^{1/2}$. When the SP value of the hydrogenated block copolymer (II) is within the above range, the compatibility with the ethylene-vinyl acetate copolymer (I) is improved, and the dry grip performance and wet grip performance of the obtained molded body are improved.

<Contents of Ethylene-Vinyl Acetate Copolymer (I) and Hydrogenated Block Copolymer (II)>

In the resin composition, the content of the ethylene-vinyl acetate copolymer (I) is 40 to 95% by mass and the content of the hydrogenated block copolymer (II) is 5 to 60% by mass. In the present invention, since the contents of the ethylene-vinyl acetate copolymer (I) and the hydrogenated block copolymer (II) are within the above ranges, it is possible to obtain a resin composition which gives a molded body having excellent dry grip performance and wet grip performance.

The content of the ethylene-vinyl acetate copolymer (I) in the resin composition is preferably 40 to 95% by mass, and more preferably 45 to 95% by mass, from the viewpoint of improving the dry grip performance and wet grip performance of the molded body.

On the other hand, the content of the hydrogenated block copolymer (II) is preferably 5 to 60% by mass, and more preferably 5 to 55% by mass from the same viewpoint.

The total content of the ethylene-vinyl acetate copolymer (I) and the hydrogenated block copolymer (II) in the resin composition of the present invention is preferably 50 to 95% by mass, more preferably 70 to 95% by mass, and still more preferably 80 to 95% by mass, from the viewpoint of more easily improving the anti-slipping property and abrasion resistance of the obtained molded body and improving the balance between flexibility and processability.

<Optional Component>

[Other Resin]

The resin composition of the present invention may contain a resin other than the ethylene-vinyl acetate copolymer (I) and the hydrogenated block copolymer (II).

Examples of the resin other than the ethylene-vinyl acetate copolymer (I) and the hydrogenated block copolymer (II) include thermoplastic elastomer resins and polyolefin-based resins.

Examples of the thermoplastic elastomer include styrene-based elastomers, olefin-based elastomers, diene-based elastomers, polyvinyl chloride-based thermoplastic elastomers, chlorinated polyethylene-based thermoplastic elastomers, polyurethane-based thermoplastic elastomers, polyester-based thermoplastic elastomers, polyamide-based thermoplastic elastomers, and fluororesin-based thermoplastic elastomers.

Examples of the polyolefin-based resin include polyethylene such as linear low-density polyethylene and high-density polyethylene. Among these, linear low-density polyethylene is preferable from the viewpoint of improving compatibility with the ethylene-vinyl acetate copolymer (I).

As the olefin-based elastomer, a thermoplastic elastomer in which ethylene-propylene rubber (EPDM, EPM) is finely dispersed in polyisobutylene, ethylene-propylene copolymer, ethylene-propylene-diene terpolymer, or polypropylene (PP) is preferable.

Examples of commercial products of the thermoplastic elastomer and the polyolefin-based resin include ENGAGE8480 (polyolefin elastomer, manufactured by The Dow Chemical Company) and STN7006 (bio-LDPE, manufactured by Braskem S. A.).

When the resin composition of the present invention contains the other resin, the content thereof is preferably 5 to 80 parts by mass, more preferably 10 to 75 parts by mass, and still more preferably 15 to 70 parts by mass with respect to 100 parts by mass of the total of the ethylene-vinyl acetate copolymer (I) and the hydrogenated block copolymer (II).

When the content of the other resin is within the above range, abrasion resistance and flexibility can be improved in addition to improvement in dry grip performance and wet grip performance.

[Crosslinking Agent]

The resin composition of the present invention preferably contains a crosslinking agent. The crosslinking agent is preferably a crosslinking agent which causes a crosslinking reaction only at a carbon-carbon double bond or an α-methylene thereof in a structural unit derived from a conjugated diene. Here, α-methylene refers to a methylene adjacent to a carbon-carbon double bond. By containing such a crosslinking agent, only the carbon-carbon double bond or the α-methylene of the carbon-carbon double bond in the block copolymer (II) is crosslinked, and it is possible to make the block copolymer (II) less slippery and excellent in abrasion resistance while maintaining excellent flexibility.

Examples of the crosslinking agent include a radical generator, sulfur, and a sulfur-containing compound. From the viewpoint of improving abrasion resistance and the like of the molded body, a radical generator is more preferable.

Examples of the radical generator include organic peroxides such as dicumyl peroxide, di-t-butyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, α,α'-bis(t-butylperoxy)diisopropylbenzene, 3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxybenzoate, t-butylperoxyisopropyl carbonate, diacetyl peroxide, lauroyl peroxide, and t-butylcumyl peroxide, and these may be used alone or in combination of two or more.

Examples of commercially available products of the radical generator include Percumyl D-40 (dicumyl peroxide, purity: 40% by mass, manufactured by NOF Corporation).

The sulfur is not particularly limited and may be any of, for example, fine powder sulfur, precipitated sulfur, colloidal sulfur, and insoluble sulfur.

Examples of the sulfur containing compound include sulfur monochloride, sulfur dichloride, disulfide compounds, and triazinethiols.

Other examples of the crosslinking agent include phenolic resins such as alkylphenol resins and brominated alkylphenol resins; a combination of p-quinone dioxime and lead dioxide; and a combination of p,p'-dibenzoylquinone dioxime and trilead tetraoxide.

When the resin composition of the present invention contains the crosslinking agent, the content thereof is preferably 0.1 to 15 parts by mass, more preferably 0.5 to 10 parts by mass, and still more preferably 1.0 to 8 parts by mass with respect to 100 parts by mass of the total of the ethylene-vinyl acetate copolymer (I) and the hydrogenated block copolymer (II). When the content of the crosslinking agent is within the above range, it is possible to improve the abrasion resistance of the obtained molded body and the hardness of the molded body.

[Crosslinking Accelerator]

The resin composition of the present invention may contain a crosslinking accelerator. Examples of the crosslinking accelerator include thiazoles such as N,N-diisopropyl-2-benzothiazole-sulfenamide, 2-mercaptobenzothiazole, di-2-benzothiazolyl disulfide, and 2-(4-morpholinodithio)benzothiazole; guanidines such as diphenylguanidine and triphenylguanidine; aldehyde-amine or aldehyde-ammonia reactants such as butyraldehyde-aniline reactant and hexamethylenetetramine-acetaldehyde reactant; imidazolines such as 2-mercaptoimidazoline; thioureas such as thiocarbanilide, diethylurea, dibutylthiourea, trimethylthiourea, and diorthotolylthiourea; thiuram mono- or polysulfides such as tetramethylthiuram monosulfide, tetramethylthiuram disulfide, and pentamethylenethiuram tetrasulfide; thiocarbamates such as zinc dimethyldithiocarbamate, zinc ethylphenyldithiocarbamate, sodium dimethyldithiocarbamate, selenium dimethyldithiocarbamate, and tellurium diethyldithiocarbamate; and xanthates such as zinc dibutylxanthate. These crosslinking accelerators may be used alone or in combination of two or more thereof.

The content of the crosslinking accelerator is preferably 0.05 to 15 parts by mass, more preferably 0.1 to 5 parts by mass, and still more preferably 0.5 to 4 parts by mass with respect to 100 parts by mass of the total of the ethylene-vinyl acetate copolymer (I) and the block copolymer (II).

[Crosslinking Aid]

The resin composition of the present invention may further contain a crosslinking aid. Examples of the crosslinking aid include fatty acids such as stearic acid, metal oxides such as zinc oxide, and fatty acid metal salts such as zinc stearate. These may be used alone, or two or more kinds thereof may be used in combination.

When the resin composition contains the crosslinking aid, the content thereof is preferably 0.1 to 15 parts by mass, and more preferably 1 to 10 parts by mass with respect to 100 parts by mass of the total of the ethylene-vinyl acetate copolymer (I) and the hydrogenated block copolymer (II).

[Filler]

The resin composition of the present invention may contain a filler other than the above-mentioned silica. As the filler, an inorganic filler and/or an organic filler can be used. Preferred examples of the inorganic filler include silicate compounds and metal oxides. The silicate compound is preferably one or more silicate compounds selected from the group consisting of kaolin, talc, clay, pyrophyllite, mica, montmorillonite, bentonite, wollastonite, sepiolite, xonotlite, zeolite, diatomaceous earth, and halloysite. Further, the metal oxide is at least one metal oxide selected from the group consisting of titanium oxide, iron oxide, magnesium oxide, aluminum oxide, cerium oxide, antimony oxide, tin oxide, lead oxide, chromium oxide, cobalt oxide, tungsten oxide, and copper oxide.

Preferable examples of the organic filler include a fine particle type organic filler and/or a fiber type organic filler. Preferable examples of the fine particle type organic filler include at least one organic filler selected from the group consisting of urethane fine particles, acrylic fine particles, styrene fine particles, acrylic/styrene-based fine particles, styrene-olefin fine particles, fluorine-based fine particles, polyethylene-based fine particles, and silicone fine particles. From the viewpoint of moldability of the resin composition, the average particle diameter of the fine particle type organic filler is preferably 2 to 50 μm. The average particle diameter can be measured by a laser diffraction method in accordance with JIS Z 8825-1.

As the fiber type organic filler, various organic fibers can be used, and preferred examples thereof include synthetic fibers such as 6-nylon fibers, 6,6-nylon fibers, 4,6-nylon fibers, aromatic polyamide fibers, para-aramid fibers, meta-aramid fibers, polyethylene terephthalate (PET) fibers, polyethylene naphthalate (PEN) fibers, polyparaphenylene benzoxazole (PBO) fibers, PVA-based fibers (vinylon), polyarylene sulfide-based fibers, 2,6-hydroxynaphthoic acid-parahydroxybenzoic acid fibers (Vectran), polyethylene (PE) fibers, polypropylene (PP) fibers, polylactic acid (PLA) fibers, polybutylene succinate (PBS) fibers, polyethylene succinate fibers, syndiotactic-1,2-polybutadiene (SPB)

fibers, and polyvinyl chloride (PVC) fibers; and natural (regenerated) fibers such as cotton, hemp, rayon, and cellulose fibers.

When the resin composition of the present invention contains a filler, the content thereof is preferably 1 to 50 parts by mass, and more preferably 2 to 20 parts by mass with respect to 100 parts by mass of the total content of the ethylene-vinyl acetate copolymer (I) and the block copolymer (II).

[Softening Agent]

The resin composition of the present invention may contain a softening agent as long as the effects of the present invention are not impaired. Oil-based softening agents such as paraffin-based, naphthene-based, and aromatic-based process oils, mineral oils, and white oils are preferably not contained in the resin composition because there is a risk of oil seeping out over time when formed into a molded body.

Examples of the softening agent which can be contained include phthalic acid derivatives such as dioctyl phthalate and dibutyl phthalate; liquid co-oligomers of ethylene and α-olefins; liquid paraffin; polybutene; low molecular weight polyisobutylene; liquid polydienes such as liquid polybutadiene, liquid polyisoprene, liquid polyisoprene/butadiene copolymer, liquid styrene/butadiene copolymer, and liquid styrene/isoprene copolymer; and hydrogenated products thereof.

When the softening agent is contained, the content thereof in the resin composition is preferably 30% by mass or less, more preferably 20% by mass or less, and still more preferably 0% by mass, that is, it is preferable that the softening agent is not contained.

[Other Additives]

To the resin composition of the present embodiment, additives other than those described above, for example, a heat aging inhibitor, an antioxidant, a light stabilizer, an antistatic agent, a mold release agent, a flame retardant, a foaming agent, a pigment, a dye, a brightening agent, and the like can be added within a range not impairing the effects of the present invention. These additives may be used alone or in combination of two or more thereof.

<Biomass Degree>

The biomass degree of the resin composition of the present invention is preferably 4 to 70% by mass, more preferably 10 to 60% by mass, and still more preferably 15 to 50% by mass. When the biomass degree is within the above range, it is possible to obtain a molded body excellent in dry grip performance and wet grip performance while using an environmentally friendly material and further suppressing the production cost.

In the description herein, the biomass degree means a value measured in accordance with ASTM D6866, and concretely can be measured according to the method described in Examples.

<Method for Producing Resin Composition>

The resin composition can be produced, for example, by melt-kneading each component except for the crosslinking agent to be added if necessary, adding the crosslinking agent, and then crosslinking by a crosslinking method described later.

The method for melt-kneading each component except for the crosslinking agent is not particularly limited, and examples thereof include a method in which the ethylene-vinyl acetate copolymer (I), the hydrogenated block copolymer (II), and other optional components are simultaneously supplied to a kneading apparatus such as a single-screw extruder, a multi-screw extruder, a Banbury mixer, a Brabender mixer, an open roll, a heating roll, or various kneaders, followed by melt-kneading. Alternatively, the method may be a method in which the ethylene-vinyl acetate copolymer (I), the hydrogenated block copolymer (II), and other optional components are supplied from separate charging ports and melt-kneaded, or a method in which the hydrogenated block copolymer (II) and some optional components such as silica and a silane coupling agent are melt-kneaded in advance and the melt-kneaded product and other optional components are melt-kneaded.

The temperature at the time of melt-kneading can be arbitrarily selected usually in the range of 20 to 270° C.

Examples of the crosslinking method include a method in which after the melt-kneading, a crosslinking agent and a crosslinking accelerator to be added as necessary are added, and crosslinking is performed by using a crosslinking die at a crosslinking temperature of usually about 120 to 200° C., preferably 140 to 200° C., and a crosslinking pressure of usually about 0.5 to 10 MPa for usually about 1 minute to 2 hours.

[Molded Body]

The molded body of the present invention is obtained by using the resin composition and is excellent in dry grip performance and wet grip performance. Specifically, the static friction coefficient of the molded body measured in accordance with ASTM D-1894 is preferably 1.5 or more, and more preferably 2.0 or more under dry conditions. Further, it is preferably 0.7 or more, and more preferably 0.9 or more under wet conditions.

The dry conditions and the wet conditions refer to measurement conditions described in Examples described later.

The shape of the molded body of the present invention may be any shape as long as it is a molded body that can be produced using the above-described resin composition, and it can be molded into various shapes such as pellets, films, sheets, plates, pipes, tubes, rods, and granules. The method for producing the molded body is not particularly limited, and the molded body can be molded by various conventional molding methods such as injection molding, blow molding, press molding, extrusion molding, and calendar molding. The above-described resin composition is particularly suitable for obtaining a press-molded body.

Since the molded body can be expected to be less slippery and excellent in abrasion resistance, it can be used for molded articles required to have these properties. In particular, it can be suitably used as a molded article such as a shoe sole using the resin composition of the present embodiment in at least a part thereof.

Specifically, it can be suitably used for: shoe sole for footwear such as hiking boots, sandals, safety shoes, mountain climbing shoes, marathon shoes, jikatabi, and boots; sports goods such as goggles, snorkels, ski boots, and ski snowboards; various grips for writing instruments such as pens and scissors, tools and electric tools such as drivers, pincers and wrenches, sanitary items such as toothbrushes and kitchen items (kitchen knives and spatulas), instruments used in sports and fitness such as golf clubs, ski stocks, bicycles and bikes, and knives; parts of home appliances such as refrigerators, vacuum cleaners, and waterproof bodies (such as mobile phones); automotive articles such as side malls, rack opinion boots, suspension boots, constant-velocity joint boots, weather strips, mat guards, floor mats, armrests, belt line malls, flash mounts and automotive interiors and exteriors (gears and knobs, etc.); office equipment such as copy machine feed and take-up rollers; furniture parts such as sofas and chair seats; rubber parts such as switch covers, stoppers, casters, and leg rubbers; and building materials such as coated plywood and coated steel plates.

Note that the molded body of the present invention is excellent in dry grip performance and wet grip performance even without a silica-containing layer containing silica on the surface of the molded body.

EXAMPLES

Hereinafter, the present invention will be specifically described with reference to Examples and Comparative Examples, but the present invention is not limited thereto. β-farnesene (purity: 97.6% by mass, manufactured by Amyris, Inc.) was purified with a 3 Å molecular sieve, distilled under a nitrogen atmosphere to remove hydrocarbon-based impurities such as zingiberene, bisabolene, farnesene epoxide, farnesol isomers, E,E-farnesol, squalene, ergosterol, and several dimers of farnesene, and used in the following polymerization.

<Ethylene-Vinyl Acetate Copolymer (I)>
  EV460 (VA=19% by mass, MFR at a temperature of 190° C. and a load of 2.16 kg=2.5 g/10 min, SP value=8.30 $(cal/cm^3)^{1/2}$, manufactured by Dow-Mitsui Polychemicals Co., Ltd.)
  EV45LX (VA=46% by mass, MFR at a temperature: of 190° C. and a load of 2.16 kg=2.5 g/10 min, SP value=8.60 $(cal/cm^3)^{1/2}$, manufactured by Dow-Mitsui Polychemicals Co., Ltd.)
<Hydrogenated Block Copolymer (II)>
  Hydrogenated block copolymer (II-1):
  A hydrogenated block copolymer (II-1) of Production Example 1 described later
  Hydrogenated block copolymer (II-2):
  Hydrogenated block copolymer (II-2) of Production Example 2 described later
<Unhydrogenated Block Copolymer (P')>
  Unhydrogenated block copolymer (P') of Production Example 3 described later
<Other Resin>
  ENGAGE8480 (polyolefin elastomer, manufactured by The Dow Chemical Company)
  STN7006 (bio-LDPE, manufactured by Braskem S. A.)
<Crosslinking Agent>
  Percumyl D-40 (purity: 40% by mass, manufactured by NOF Corporation)
<Crosslinking Aid>
  Zinc oxide: Zinc oxide type 1, manufactured by Sakai Chemical Industry Co., Ltd.
  Stearic acid: Lunac S-20 manufactured by Kao Corporation

[Measuring Method]

The details of each measurement method for the polymers obtained in Production Examples are as follows.

(1) Measurement of Peak Top Molecular Weight and Molecular Weight Distribution

The peak top molecular weight of the hydrogenated block copolymer, the peak top molecular weight (Mp) of the styrene block, and the molecular weight distribution (Mw/Mn) were determined by GPC (gel permeation chromatography) in terms of standard polystyrene equivalent molecular weight, and the peak top molecular weight (Mp) was determined from the position of the top of the peak of the molecular weight distribution. The measuring apparatus and conditions are as follows.

Apparatus: GPC apparatus "HLC-8320GPC" (manufactured by Tosoh Corporation)
  Separation column: Column "TSKgelSuperHZ4000" manufactured by Tosoh Corporation
  Eluent: Tetrahydrofuran
  Eluent flow rate: 0.7 mL/min
  Sample concentration: 5 mg/10 mL
  Column temperature: 40° C.

(2) Measuring Method of Hydrogenation Rate

The block copolymer (P) and the hydrogenated block copolymer (II) were each dissolved in a deuterated chloroform solvent, and $^1$H-NMR was measured at 50° C. using "Lambda-500" manufactured by JEOL Ltd.

The hydrogenation rate of the carbon-carbon double bond in the structural unit derived from conjugated diene in the hydrogenated block copolymer (II) was calculated from the peak of the proton of the carbon-carbon double bond appearing at 4.5 to 6.0 ppm in the obtained spectrum according to the following formula.

Hydrogenation rate (mol %)={1−(mole number of carbon-carbon double bonds contained per mol of the hydrogenated block copolymer (II))/(mole number of carbon-carbon double bonds contained per mol of the block copolymer (P))}×100

Production Example 1

Hydrogenated block copolymer (II-1)

A nitrogen-purged and dried pressure-resistant container was charged with 50.0 kg of cyclohexane as a solvent, 0.1905 kg of sec-butyllithium (10.5% by mass cyclohexane solution) as an anionic polymerization initiator, and 0.40 kg of tetrahydrofuran as a Lewis base, heated to 50° C., added with 6.34 kg of β-farnesene and polymerized for 2 hours, subsequently added with 2.50 kg of styrene (1) and polymerized for 1 hour, and further added with 3.66 kg of butadiene and polymerized for 1 hour. Subsequently, 0.02 kg of dichlorodimethylsilane was added as a coupling agent to this polymerization reaction solution and reacted for 1 hour, thereby obtaining a reaction solution containing a poly(β-farnesene)-polystyrene-polybutadiene-polystyrene-poly(β-farnesene) pentablock copolymer (P-1).

To this reaction solution, palladium-carbon (supported amount of palladium: 5% by mass) as a hydrogenation catalyst was added in an amount of 5% by mass to the block copolymer (P-1), and the reaction was carried out for 10 hours under the condition of a hydrogen pressure of 2 MPa and 150° C. After allowing to cool and releasing the pressure, palladium-carbon was removed by filtration, and the filtrate was concentrated and further dried under vacuum, thereby obtaining a hydrogenated product (II-1) of a poly(β-farnesene)-polystyrene-polybutadiene-polystyrene-poly(β-farnesene) pentablock copolymer (hereinafter referred to as "hydrogenated block copolymer (II-1)"). The biomass degree of the obtained hydrogenated block copolymer (II-1) measured in accordance with ASTM D6866 was 50% by mass.

For the obtained hydrogenated block copolymer (II-1), the above-mentioned physical properties were measured. The results are shown in Table 1.

Production Example 2

Hydrogenated block copolymer (II-2)

A nitrogen-purged and dried pressure-resistant container was charged with 50.0 kg of cyclohexane as a solvent and 0.0413 kg of sec-butyllithium (10.5% by mass cyclohexane solution) as an anionic polymerization initiator, heated to 50° C., added with 1.12 kg of styrene (1) and polymerized for 1 hour, subsequently added with 10.25 kg of β-farnesene and polymerized for 2 hours, further added with 1.12 kg of styrene (2) and polymerized for 1 hour to obtain a reaction solution containing a polystyrene-poly(β-farnesene)-polystyrene triblock copolymer (P-2). To this reaction solution, palladium-carbon (supported amount of palladium: 5% by mass) as a hydrogenation catalyst was added in an amount of 5% by mass to the block copolymer (P-2), and the reaction was carried out for 10 hours under the condition of a hydrogen pressure of 2 MPa and 150° C. After allowing to cool and releasing the pressure, palladium-carbon was removed by filtration, and the filtrate was concentrated and further dried under vacuum, thereby obtain a hydrogenated product of a polystyrene-poly(β-farnesene)-polystyrene triblock copolymer (hereinafter referred to as "hydrogenated block copolymer (II-2)"). The biomass degree of the obtained hydrogenated block copolymer (II-2) measured in accordance with ASTM D6866 was 82% by mass. For the hydrogenated block copolymer (II-2), the above-mentioned physical properties were measured. The results are shown in Table 1.

Production Example 3

Unhydrogenated Block Copolymer (P')

A nitrogen-purged and dried pressure-resistant container was charged with 50.0 kg of cyclohexane as a solvent and 0.073 kg of sec-butyllithium (10.5% by mass cyclohexane solution) as an anionic polymerization initiator, heated to 50° C., added with 1.25 kg of styrene (1) and polymerized for 1 hour, added with 0.27 kg of tetrahydrofuran as a Lewis base, subsequently added with 10.00 kg of isoprene and polymerized for 2 hours, further added with 1.25 kg of styrene (2) and polymerized for 1 hour to obtain a reaction solution containing a styrene-isoprene-styrene triblock copolymer (P').

To this reaction solution was added 200 mL of methanol to terminate the polymerization reaction. The obtained mixed solution was washed with water and then reprecipitated in a large amount of methanol to obtain a styrene-isoprene-styrene triblock copolymer (hereinafter also referred to as "unhydrogenated block copolymer (P')").

For the unhydrogenated block copolymer (P'), the above-mentioned physical properties were measured. The results are shown in Table 1.

TABLE 1

| | | | Production Example 1 II-1 | Production Example 2 II-2 | Production Example 3 P' |
|---|---|---|---|---|---|
| Amount used (kg) | Cyclohexane | | 50.0 | 50.0 | 50 |
| | sec-Butyllithium (10.5% by mass cyclohexane solution) | | 0.1905 | 0.0413 | 0.073 |
| | Tetrahydrofuran | | 0.40 | — | 0.27 |
| | Polymer block (A) | Styrene (1) | 2.50 | 1.12 | 1.25 |
| | | Styrene (2) | — | 1.12 | 1.25 |
| | Polymer block (B) (b1) | β-farnesene | 6.34 | 10.25 | — |
| | Polymer block (C) | Butadiene | 3.66 | — | — |
| | | Isoprene | — | — | 10.00 |
| | Dichlorodimethylsilane | | 0.02 | — | — |
| | (A)/(B) [mass ratio] (*1) | | 28/72 | 18/82 | — |
| | (b1)/(B) [% by mass] (*2) | | 100 | 100 | — |
| | (b1)/[(B) + (C)] [% by mass] (*3) | | 63 | — | — |
| | Polymer skeleton (*4) | | F-St-Bd-St-F | St-F-St | St-Ip-St |
| Physical properties | Peak top molecular weight (Mp) of styrene block | | 8,000 | 16,600 | 10,500 |
| | Peak top molecular weight (Mp) of hydrogenated block copolymer | | 102,000 | 201,000 | 140,000 |
| | Hydrogenation rate (mol %) (*5) | | 93.0 | 93.2 | 0.0 |
| | Molecular weight distribution (Mw/Mn) | | 1.5 | 1.23 | 1.03 |

*1: The mass ratio of the polymer block (A) and the polymer block (B).
*2: The content (% by mass) of the structural unit (b1) derived from farnesene in the polymer block (B).
*3: The content (% by mass) of the structural unit (b1) derived from farnesene in the polymer block (B) and the polymer block (C).
*4: F-St-Bd-St-F denotes a poly(β-farnesene)-polystyrene-polybutadiene-polystyrene-poly(β-farnesene) pentablock copolymer. St-F-St denotes a polystyrene-poly(β-farnesene)-polystyrene triblock copolymer. St-Ip-St denotes a polystyrene-polyisoprene-polystyrene triblock copolymer.
*5: Hydrogenation rate of the hydrogenated block copolymer (II) indicates the hydrogenation rate of the carbon-carbon double bond in the structural unit derived from conjugated diene in the block copolymer (P).

Examples 1 to 9 and Comparative Examples 1 to 6

(1) Melt-Kneading (Production of Resin Composition)

In accordance with the mix proportion (parts by mass) shown in Table 3, the components were put into a Brabender mixer (product name: Plastograph EC50cc mixer, manufactured by Brabender GmbH & Co. KG) in the order and under the conditions shown in Table 2, and melt-kneaded (steps 1 and 2). Thereafter, the melt-kneaded product was taken out of the Brabender mixer (step 3). Next, the melt-kneaded product was again charged into the Brabender and kneaded (step 4), and then a crosslinking agent was charged and kneaded again (step 5) to obtain a resin composition.

(2) Molding (Production of Molded Body)

The obtained resin composition was compression-molded (170° C., 7 to 10 minutes) and crosslinked to obtain a sheet (0.5 mm in thickness).

The physical properties of the obtained sheet were evaluated according to the following evaluation methods. The results are shown in Table 3.

TABLE 2

|  | Temperature (° C.) | | Screw rotation speed (rpm) | Time (min) |
|---|---|---|---|---|
|  | Brabender | Resin composition | | |
| Step 1 Charging the copolymers (I, (II), (II') and other resins | 110 |  | 50 | 1 |
| Step 2 Charging the crosslinking aid and the filler | 110 | 170-180 | Adjust according to temperature | 10 |
| Step 3 Taken out |  |  |  |  |
| Step 4 Re-kneading the kneaded product | 110 |  |  |  |
| Step 5 Charging the crosslinking agent | 110 | <130 | Adjust according to temperature | 5 |

<Evaluation Method>
[Static Friction Coefficient]
(1) Dry Condition

In accordance with ASTM D-1894, the static friction coefficients of the surfaces of the sheets obtained in Examples and Comparative Examples were measured.

A test piece having a length of 110 mm, a width of 63.5 mm, and a thickness of 0.5 mm was cut out from the sheet, wound around a cell (weight of 200 g, 63.5 mm×63.5 mm), and fixed to an autograph head so that a test piece stand of a friction coefficient measuring apparatus was horizontal. The material of the friction table was aluminum, and the static friction coefficient was measured at a tensile speed of 150 mm/min. As the numerical value of the static friction coefficient is higher, the friction force is larger, the slip is less likely to occur, and the dry grip performance is excellent.

(2) Wet Condition

The static friction coefficient was measured in the same manner as in (1) Dry condition above, except that 1 cc of distilled water was dripped on the friction table. As the numerical value of the static friction coefficient is higher, the friction force is larger, the slip is less likely to occur, and the wet grip performance is excellent.

<Biomass Degree>

Biomass degree (% by mass)=$(M_I \times X_I/100)+(M_{II} \times X_{II}/100)$ (In the above formula, $M_I$ represents the mass ratio (% by mass) of the ethylene-vinyl acetate copolymer (I) to the total mass of the ethylene-vinyl acetate copolymer (I) and the hydrogenated block copolymer (II), and $M_{II}$ represents the mass ratio (% by mass) of the hydrogenated block copolymer (II) to the total mass of the ethylene-vinyl acetate copolymer (I) and the hydrogenated block copolymer (II). $X_I$ (%) represents the biomass degree of the ethylene-vinyl acetate copolymer (I), and $X_{II}$ (%) represents the biomass degree of the hydrogenated block copolymer (II). The biomass degree is measured in accordance with ASTM D6866.)

TABLE 3

| | | | Biomass degree (% by mass) | SP value $(cal/cm^3)^{1/2}$ | Example 1 | 2 | 3 | 4 | 5 | 6 |
|---|---|---|---|---|---|---|---|---|---|---|
| Mix proportion of the resin composition (parts by mass) | Ethylene-Vinyl Acetate Copolymer (I) | EV460 (VA = 19% by mass) | 0 | 8.30 | 90 | 90 | 80 | 80 | 50 | 50 |
| | | EV45LX (VA = 46% by mass) | 0 | 8.60 | | | | | | |
| | Hydrogenated Block Copolymer (II) | (II-1) | 50 | 8.43 | | 10 | | 20 | | 50 |
| | | (II-2) | 82 | 8.09 | 10 | | 20 | | 50 | |
| | Unhydrogenated block copolymer (P') | (P') | 0 | 8.61 | | | | | | |
| | Other resin | ENGAGE8480 | 0 | — | | | | | | |
| | | STN7006 | 95 | — | | | | | | |
| | Crosslinking agent | Percumyl D-40 | 0 | — | 2.25 | 2.25 | 2.25 | 2.25 | 2.25 | 2.25 |
| | Crosslinking aid | Zinc oxide | 0 | — | 2 | 2 | 2 | 2 | 2 | 2 |
| | | Stearic acid | 0 | — | 1 | 1 | 1 | 1 | 1 | 1 |
| | Filler | Titanium oxide | 0 | — | 4 | 4 | 4 | 4 | 4 | 4 |
| Characteristics | Content of the copolymer (I) in the composition (% by mass) | | | | 82.4 | 82.4 | 73.2 | 73.2 | 45.8 | 45.8 |
| | Content of the copolymer (II) in the composition (% by mass) | | | | 9.2 | 9.2 | 18.3 | 18.3 | 45.8 | 45.8 |
| | Biomass degree of the molded body (% by mass) | | | | 7.5 | 4.6 | 15.0 | 9.2 | 37.5 | 22.9 |
| Evaluation | Static friction coefficient | Dry condition | | | 2.5 | 2.1 | 2.5 | 2.5 | 4.0 | 5.5 |
| | | Wet condition | | | 1.0 | 1.0 | 1.1 | 0.9 | 3.4 | 2.2 |

| | | | Biomass degree (% by mass) | SP value $(cal/cm^3)^{1/2}$ | Example 7 | 8 | 9 | Comparative Example 1 | 2 |
|---|---|---|---|---|---|---|---|---|---|
| Mix proportion of the resin composition (parts by mass) | Ethylene-Vinyl Acetate Copolymer (I) | EV460 (VA = 19% by mass) | 0 | 8.30 | 75 | | | 100 | 90 |
| | | EV45LX (VA = 46% by mass) | 0 | 8.60 | | | 48 | 90 | |
| | Hydrogenated Block Copolymer (II) | (II-1) | 50 | 8.43 | | | | | |
| | | (II-2) | 82 | 8.09 | 40 | 10 | 10 | | |

TABLE 3-continued

| | | | | | | | | | |
|---|---|---|---|---|---|---|---|---|---|
| | Unhydrogenated block copolymer (P') | (P') | 0 | 8.61 | | | | | 10 |
| | Other resin | ENGAGE8480 | 0 | — | 25 | | | | |
| | | STN7006 | 95 | — | 10 | 42 | | | |
| | Crosslinking agent | Percumyl D-40 | 0 | — | 7.5 | 7.5 | 7.5 | 2.25 | 2.25 |
| | Crosslinking aid | Zinc oxide | 0 | — | 5 | 5 | 5 | 2 | 2 |
| | | Stearic acid | 0 | — | 1 | 1 | 1 | 1 | 1 |
| | Filler | Titanium oxide | 0 | — | 5 | 5 | 5 | 4 | 4 |
| Characteristics | Content of the copolymer (I) in the composition (% by mass) | | | | 44.5 | 40.5 | 75.9 | 91.5 | 82.4 |
| | Content of the copolymer (II) in the composition (% by mass) | | | | 23.7 | 8.4 | 8.4 | 0.0 | 0.0 |
| | Biomass degree of the molded body (% by mass) | | | | 25.1 | 40.6 | 6.9 | 0 | 0 |
| Evaluation | Static friction coefficient | Dry condition | | | 2.4 | 2.8 | 7.3 | 1.8 | 2.1 |
| | | Wet condition | | | 1.1 | 1.3 | 3.5 | 0.6 | 0.7 |

| | | | Biomass degree (% by mass) | SP value (cal/cm³)$^{1/2}$ | Comparative Example | | | |
|---|---|---|---|---|---|---|---|---|
| | | | | | 3 | 4 | 5 | 6 |
| Mix proportion of the resin composition (parts by mass) | Ethylene-Vinyl Acetate Copolymer (I) | EV460 (VA = 19% by mass) | 0 | 8.30 | 80 | 50 | 75 | |
| | | EV45LX (VA = 46% by mass) | 0 | 8.60 | | | | 100 |
| | Hydrogenated Block Copolymer (II) | (II-1) | 50 | 8.43 | | | | |
| | | (II-2) | 82 | 8.09 | | | | |
| | Unhydrogenated block copolymer (P') | (P') | 0 | 8.61 | 20 | 50 | | |
| | Other resin | ENGAGE8480 | 0 | — | | | 25 | |
| | | STN7006 | 95 | — | | | | |
| | Crosslinking agent | Percumyl D-40 | 0 | — | 2.25 | 2.25 | 7.5 | |
| | Crosslinking aid | Zinc oxide | 0 | — | 2 | 2 | 5 | |
| | | Stearic acid | 0 | — | 1 | 1 | 1 | |
| | Filler | Titanium oxide | 0 | — | 4 | 4 | 5 | |
| Characteristics | Content of the copolymer (I) in the composition (% by mass) | | | | 73.2 | 45.8 | 63.3 | 100.0 |
| | Content of the copolymer (II) in the composition (% by mass) | | | | 0.0 | 0.0 | 0.0 | 0.0 |
| | Biomass degree of the molded body (% by mass) | | | | 0 | 0 | 0 | 0 |
| Evaluation | Static friction coefficient | Dry condition | | | 2.3 | 2.6 | 1.4 | 6.7 |
| | | Wet condition | | | 0.7 | 0.7 | 0.7 | 3.3 |

As can be seen from the results in Table 3, according to the resin composition of the present invention, a molded body excellent in dry grip performance and wet grip performance can be obtained.

The invention claimed is:

1. A resin composition comprising
an ethylene-vinyl acetate copolymer (I) and
a hydrogenated block copolymer (II), wherein the hydrogenated block copolymer (II) is a hydrogenated product of a block copolymer (P) containing
   a polymer block (A) containing a structural unit derived from an aromatic vinyl compound and
   a polymer block (B) containing
      1 to 100% by mass of a structural unit (b1) derived from farnesene and
      99 to 0% by mass of a structural unit (b2) derived from a conjugated diene other than farnesene,
wherein
the hydrogenation rate of carbon-carbon double bonds in the structural unit derived from a conjugated diene in the block copolymer (P) is 70 mol % or more,
in the resin composition, the content of the ethylene-vinyl acetate copolymer (I) is 40 to 95% by mass and the content of the hydrogenated block copolymer (II) is 5 to 60% by mass, and
the polymer block (A) has a peak top molecular weight of 5,000 to 100,000.

2. The resin composition according to claim 1, having a biomass degree of 4 to 70% by mass.

3. The resin composition according to claim 1, wherein a content ratio of a structural unit derived from vinyl acetate in the ethylene-vinyl acetate copolymer (I) is 5 to 60% by mass.

4. The resin composition according to claim 1, wherein the aromatic vinyl compound is styrene.

5. The resin composition according to claim 1, wherein the conjugated diene other than farnesene is at least one selected from butadiene, isoprene, and myrcene.

6. The resin composition according to claim 1, wherein a mass ratio [(A)/(B)] of the polymer block (A) to the polymer block (B) is 10/90 to 40/60.

7. The resin composition according to claim 1, wherein the hydrogenated block copolymer (II) further has a polymer block (C) composed only of a structural unit derived from a conjugated diene other than farnesene.

8. The resin composition according to claim 1, wherein an SP value of the ethylene-vinyl acetate copolymer (I) is 4.0 to 10.0 (cal/cm³)$^{1/2}$, and an SP value of the hydrogenated block copolymer (II) is 6.0 to 10.0 (cal/cm³)$^{1/2}$.

9. The resin composition according to claim 1, wherein the hydrogenated block copolymer (II) has a peak top molecular weight of 50,000 to 500,000.

10. A molded body at least partially using the resin composition according to claim 1.

* * * * *